US011956105B2

(12) United States Patent
Thejaswi et al.

(10) Patent No.: US 11,956,105 B2
(45) Date of Patent: Apr. 9, 2024

(54) SOFT-DECISION INFORMATION GENERATION FOR RECEIVER

(71) Applicant: Nokia Solutions and Networks Oy, Espoo (FI)

(72) Inventors: Chandrashekhar Thejaswi, Bangalore (IN); Suresh Kalyanasundaram, Bangalore (IN); Karthik Kuntikana Shrikrishna, Bangalore (IN); Francis Dominique, Sunnyvale, CA (US); Lele Shen, Hangzhou (CN)

(73) Assignee: Nokia Solutions and Networks Oy, Espoo (FI)

( * ) Notice: Subject to any disclaimer, the term of this patent is extended or adjusted under 35 U.S.C. 154(b) by 14 days.

(21) Appl. No.: 17/793,698

(22) PCT Filed: Jan. 22, 2020

(86) PCT No.: PCT/CN2020/073665
§ 371 (c)(1),
(2) Date: Jul. 19, 2022

(87) PCT Pub. No.: WO2021/146975
PCT Pub. Date: Jul. 29, 2021

(65) Prior Publication Data
US 2023/0080729 A1 Mar. 16, 2023

(51) Int. Cl.
*H04L 27/06* (2006.01)
*H04L 25/03* (2006.01)

(52) U.S. Cl.
CPC .............................. *H04L 25/03305* (2013.01)

(58) Field of Classification Search
CPC ..... H04L 25/03305; H04L 2025/03426; H04L 25/03318; H04L 25/03891; H04L 25/032; H04B 7/0854
(Continued)

(56) References Cited

U.S. PATENT DOCUMENTS 8,204,155 B2 * 6/2012 Sadowsky ......... H04L 25/03222
375/324
9,906,389 B2 * 2/2018 Futatsugi ............ H04L 27/2666
(Continued)

FOREIGN PATENT DOCUMENTS

| CN | 101997652 A | 3/2011 |
|---|---|---|
| CN | 103997474 A | 8/2014 |

(Continued)

OTHER PUBLICATIONS

Lee, Kyungchun et al., "Optimal Lattice-Reduction Aided Successive Interference Cancellation for MIMO Systems", IEEE Transactions on Wireless Communications, vol. 6, No. 7, Jul. 31, 2007, 6 pgs.

(Continued)

*Primary Examiner* — Helene E Tayong
(74) *Attorney, Agent, or Firm* — Joseph C. Drish; Harrington & Smith

(57) ABSTRACT

Embodiments of the present disclosure relate to a method, an apparatus and a computer readable storage medium for generating soft-decision information for a receiver. In example embodiments, a method is provided. The method includes receiving, at a first device, a signal from a second device, the signal corresponding to a group of symbols transmitted from the second device; determining, by performing Lattice Reduction linear detection on the signal, a first group of estimated symbols for the group of symbols; determining, by performing iterative interference cancellation on the first group of estimated symbols, a second group of estimated symbols for the group of symbols; and generating, based on the second group of estimated symbols, soft-decision information about the group of symbols for use by a decoder at the first device. Embodiments of the present (Continued)

disclosure can improve the receiver performance with reduced complexity.

15 Claims, 7 Drawing Sheets

(58) Field of Classification Search
USPC .......................................................... 375/340
See application file for complete search history.

(56) References Cited

U.S. PATENT DOCUMENTS

| | | | | |
|---|---|---|---|---|
| 2002/0122407 A1* | 9/2002 | Molnar | ................. | H04L 1/0045 370/347 |
| 2002/0122510 A1* | 9/2002 | Yakhnich | .............. | H04L 25/067 714/795 |
| 2007/0206697 A1 | 9/2007 | Qiu et al. | ....................... | 375/267 |

FOREIGN PATENT DOCUMENTS

| | | |
|---|---|---|
| EP | 1337082 A1 | 8/2003 |
| EP | 2 876 820 A1 | 5/2015 |

OTHER PUBLICATIONS

Goncharov, Evgeny, "Comparison of PIC and SIC with Lattice Reduction cancellation schemes for V-BLAST MIMO system", Proc. EECSI 2019, Bandung, Indonesia, Sep. 18-20, 2019.

Park, Jaehyun et al., "Improved Lattice Reduction-Aided MIMO Successive Interference Cancellation Under Imperfect Channel Estimation", IEEE Transactions on Signal Processing, vol. 60, No. 6, Jun. 30, 2012, abstract only.

Gestner, Brian, at al., "Lattice Reduction for MIMO Detection: From Theoretical Analysis to Hardware Realization", IEEE Transactions On Circuits And Systems—I: Regular Pagers, vol. 58, No. 4, Apr. 2011, pp. 813-826.

* cited by examiner

SOFT-DECISION INFORMATION GENERATION FOR RECEIVER

CROSS REFERENCE TO RELATED APPLICATION

This patent application is a U.S. National Stage application of International Patent Application Number PCT/CN2020/073665 filed Jan. 22, 2020, which is hereby incorporated by reference in its entirety.

TECHNICAL FIELD

Embodiments of the present disclosure generally relate to the field of telecommunications, and in particular, to a method, an apparatus and a computer readable medium for generating soft-decision information for a receiver.

BACKGROUND

The advent of the fifth generation (5G) communication protocol has resulted in networks becoming denser. With the use of Massive Multiple-Input Multiple-Output (MIMO), spectral resource reuse increases significantly, resulting in the need to mitigate and handle inter-user interference efficiently. The ability to mitigate interference is becoming a significant issue in a 5G communication system. Field trials are showing interference as being a significant factor is limiting throughput, especially for those link configurations that use 256-QAM. In the uplink (UL), the use of advanced receiver techniques (such as, joint reception) with advanced detection techniques (such as, maximum likelihood detection, sphere decoding, lattice reduction and so on) are increasingly becoming must have features for good UL performance.

The MIMO detection algorithms exhibit a trade-off between performance and computational complexity. The simpler MIMO algorithms are mostly linear in nature and provide sub-optimal performance, whereas the optimal maximum likelihood detection algorithm employs joint decoding strategies and is non-linear in nature with a significantly increased complexity. In this direction, the MIMO receivers based on the principle of lattice reduction (LR) have become popular recently as they bring a good balance between complexity and performance.

SUMMARY

In general, example embodiments of the present disclosure provide a method, an apparatus and a computer readable storage medium for generating soft-decision information for a receiver.

In a first aspect, there is provided an apparatus. The apparatus comprises at least one processor; and at least one memory including computer program codes; the at least one memory and the computer program codes are configured to, with the at least one processor, cause the apparatus to receive a signal from a further apparatus, the signal corresponding to a group of symbols transmitted from the further apparatus; determine, by performing Lattice Reduction linear detection on the signal, a first group of estimated symbols for the group of symbols; determine, by performing iterative interference cancellation on the first group of estimated symbols, a second group of estimated symbols for the group of symbols; and generate, based on the second group of estimated symbols, soft-decision information about the group of symbols for use by a decoder at the apparatus.

In a second aspect, there is provided a method. The method comprises receiving, at a first device, a signal from a second device, the signal corresponding to a group of symbols transmitted from the second device; determining, by performing Lattice Reduction linear detection on the signal, a first group of estimated symbols for the group of symbols; determining, by performing iterative interference cancellation on the first group of estimated symbols, a second group of estimated symbols for the group of symbols; and generating, based on the second group of estimated symbols, soft-decision information about the group of symbols for use by a decoder at the first device.

In a third aspect, there is provided an apparatus. The apparatus comprises means for receiving a signal from a further apparatus, the signal corresponding to a group of symbols transmitted from the further apparatus; means for determining, by performing Lattice Reduction linear detection on the signal, a first group of estimated symbols for the group of symbols; means for determining, by performing iterative interference cancellation on the first group of estimated symbols, a second group of estimated symbols for the group of symbols; and means for generating, based on the second group of estimated symbols, soft-decision information about the group of symbols for use by a decoder at the apparatus.

In a fourth aspect, there is a computer readable storage medium comprising program instructions stored thereon. The instructions, when executed by an apparatus, cause the apparatus to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

DETAILED DESCRIPTION

Figure 1A:
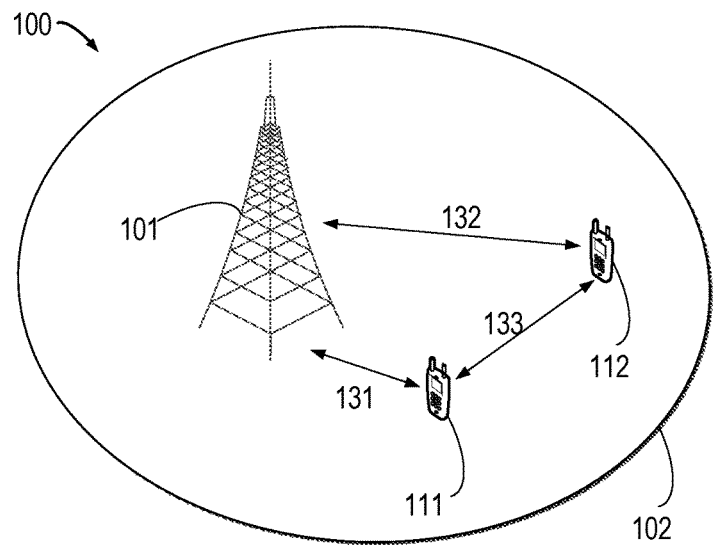
FIGS. 1A-1B show schematic diagrams of an example communication system in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As described above, the MIMO receivers based on the principle of lattice reduction (LR) have become popular recently as they bring a good balance between complexity and performance. LR detectors are based on the principle of lattice theory.

Consider a MIMO transmission system with $N_t$ transmit antennas and $N_r$ receive antennas, with the system model given by $$y=Hs+n$$

where y is the $N_r \times 1$ received signal vector; H is the $N_r \times N_t$ channel matrix; s is the $N_t \times 1$ transmitted signal vector; and n is the $N_r \times 1$ complex circularly symmetric additive Gaussian noise process with $n \sim \mathcal{CN}(0,1_{N_r})$.

It is assumed that the elements of the signal vector s are complex integers including zero. There is no loss of generality in this assumption since for any given transmitted symbol vector x with its elements from a given modulation constellation, the corresponding vector s of complex integers can be related by the shift-and-scale transformation $$x=\alpha s+\beta 1_{N_t}$$

where $(\alpha,\beta)$ are appropriately chosen scaling and shifting factors determined by the modulation constellation.

Let $\mathcal{L}(H)$ denote the lattice spanned by the columns of H, i.e., the set of complex integer-weighted linear combinations of the columns of H. That is, $$\mathcal{L}(H) = \left\{ y : y = Hs = \sum_{n=1}^{N_t} s_n h_n, s_n \in \mathbb{Z}_C \right\}$$

where $\mathbb{Z}_C$ is the set of complex integers. For the transmitted signal vector s, the corresponding channel output Hs can be viewed as a point in a lattice spanned by the columns of H.

An important result from the lattice theory states that a matrix $\tilde{H}$ generates the same lattice as H if and only if $\tilde{H}=HT$ and T is a unimodular matrix (Matrix T is unimodular if T and $T^{-1}$ contain only integer entries and the det(T)=±1.). That is, $$\mathbb{Z}(\tilde{H})=\mathbb{Z}(H) \Leftrightarrow \tilde{H}=HT \text{ and } T \text{ is a unimodular matrix}$$

The objective of lattice reduction is to transform a given basis H into a new basis $\tilde{H}$ such that $\tilde{H}$ is a "better orthogonal matrix". Usually, $\tilde{H}$ is much better conditioned than H. In general, the problem of finding the optimal set of basis vectors is of high complexity. Therefore, there exist suboptimal LR algorithms which find a "well-behaved" channel matrix $\tilde{H}$ by performing a sequence of elementary column operations H such that $\tilde{H}=HT$, where T is a unimodular matrix (matrix with only integer entries and the absolute value of its determinant equal to unity), representing a sequence of elementary operations. The most popular LR algorithm is the Lenstra-Lenstra-Lovasz (LLL) algorithm.

The LR-detector works in the lattice reduced domain to estimate the transmitted symbols. Observing that, $\tilde{H}=HT$, the system model can be transformed into the LR-domain signal model as $$y=\tilde{H}z+n$$

where $z=T^{-1}s$ is the LR-domain signal. A suitable detection method can be employed on this transformed system model to estimate the LR-domain signal z which in turn is used to estimate the transmitted symbol s. The detection is performed on the reduced basis $\tilde{H}$ to estimate $\hat{z}$ in the lattice-reduced constellation and then the transmitted symbol estimate $\hat{s}$ is recovered by the transformation $\hat{s}=T\hat{z}$. Such detection is robust due to a better-conditioned channel $\tilde{H}$.

The key advantage of LR based detection scheme is that even LR-linear detectors yield error rate curves whose slope is equal to those for maximum-likelihood (ML) detection, at only a fraction of the complexity. In particular, in a MIMO channel comprising $N_t$ transmit antennas and $N_r$ receive antennas with a transmission of $N_s \leq N_t$ parallel data streams, the Bit Error Ratio (BER) curves of a LR-linear detector exhibit the full receiver diversity order $N_r$, whereas those of conventional methods (linear equalization, decision-feedback equalization, and so on) exhibit diversity order of at most $N_r-N_s+1$.

However, a major issue with LR-linear receivers in practical deployments is their inability to generate soft symbol level decisions for Log-Likelihood Ratio (LLR) computation. LR detectors are based on the principle of detection on the "reduced lattice basis", and their symbol detection performance is very robust owing to the lattice reduction principle. Further, even linear detector versions based on lattice reduction can yield full receiver diversity gain without any additional processing. Therefore, owing to the simplicity and robust performance, LR linear detectors (LRLD) can be potential candidates for MIMO/multiuser reception. Adopting these simple, yet powerful, LRLDs in practical deployments has been impeded by their inability to generate soft decision at the symbol level. This issue has been identified as the future research topic of high practical relevance.

To explain further, it is well known that the BER performance of receivers employing soft decision at the symbol level is superior to its counterpart employing hard decision at the symbol level. The reason is that there is an inherent "quantization loss" associated with the hard decision, resulting in the degraded performance. More importantly, soft-output detectors provide a significant benefit when combined with channel coding schemes which make use of soft information to generate bit-wise LLRs. While LRLDs are robust in their detection performance, unfortunately, they suffer from the issue that the detector output is hard-valued, unlike conventional linear detectors. In other words, LRLDs are effective only when the hard-decisions are made at the symbol level. This consideration makes it challenging to generate soft-valued outputs at the symbol level from the LRLDs.

There has been some schemes on soft value generation in LR receivers. However, all of these schemes propose LR soft-value computation based on the concept of List generation (motivated by List Sphere Decoding). The List generation drastically increases complexity, which defeats the purpose of using LR as a low-complexity method.

Embodiments of the present disclosure consider transmission scenarios in a MIMO cellular network and propose a soft-value based LRLD for the MIMO/multi-user receiver, so as to at least in part solve the above and other potential problems. Embodiments of the present disclosure can improve the receiver performance in terms of Block Error Rate (BLER) and multiplexing gain with reduced complexity. In the following, some example embodiments of the present disclosure will be described with reference to the figures. However, those skilled in the art would readily appreciate that the detailed description given herein with respect to these figures is merely for the purpose of illustration, without suggesting any limitations to the scope of the present disclosure.

FIG. 1A is a diagram illustrating an example communication system 100 in which embodiments of the present disclosure can be implemented. The communication system 100 may include a network device 101 and a plurality of terminal devices 111 and 112 served by the network device 101. The network 100 may provide one or more serving cells 102 to serve the terminal devices 111 and 112. The terminal devices 111 and 112 may communicate with the network device 101 via channels 131 and 132 respectively, and/or may communicate with each other via a channel 133. It is to be understood that the number of network devices, terminal devices and/or serving cells is only for the purpose of illustration without suggesting any limitations to the scope of the present disclosure.

Figure 1B:
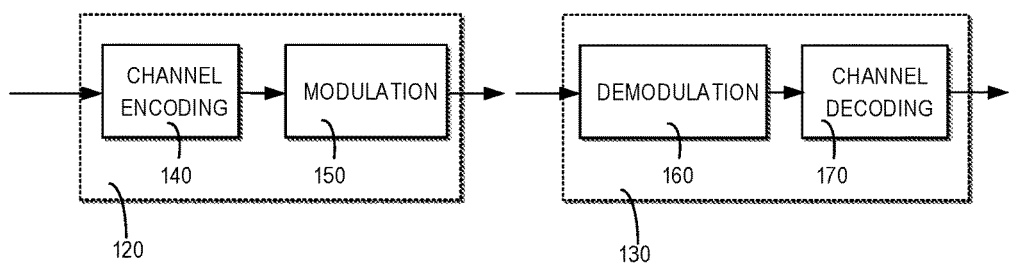

FIG. 1B is a simplified diagram illustrating processing implemented at a transmitting device 120 and a receiving device 130 in communication. In some embodiments, the network device 101 may act as the transmitting device 120, while the terminal device 111 or 112 in FIG. 1A may act as the receiving device 130. In some embodiments, the network device 101 may act as the receiving device 130, while the terminal device 111 or 112 in FIG. 1A may act as the transmitting device 120.

As shown in FIG. 1B, in order to ensure reliable transmission of data (including control signaling), the transmitting device 120 may perform channel encoding (140) on the data to be transmitted to introduce redundancy, thereby resisting distortion probably introduced in a transmission channel (for example, 131, 132, and 133 in FIG. 1A). Alternatively, the channel-encoded data may be further interleaved (not shown) and/or modulated (150) before being transmitted. At the receiving device 130, a process reverse to that of the transmitting device 120 is performed. That is, the received signal is demodulated (160), de-interleaved (not shown) and decoded (170) to recover the transmitted data. In some embodiments, other or different processing may be involved at the transmitting device 120, and the receiving device 130 may perform a reverse operation accordingly.

In some embodiments, Low Density Parity Check (LDPC), Polar and/or Turbo codes may be used as error correction codes in the channel encoding process 140 in FIG. 1B. It is to be understood that the channel as used herein refers to an encoding channel, namely a channel involved in the encoding process from an input to an output, rather than the transmission channel 131, 132 or 133 in FIG. 1A. Accordingly, the channel decoding process 170 in FIG. 1B may be used for decoding the received signals including the error correction codes, such as, LDPC, Polar and/or Turbo codes.

In the modulation process 150 in FIG. 1B, any modulation technique currently known or to be developed in the future may be used, such as Binary Phase Shift Keying (BPSK), π/2-BPSK, Quadrature Phase Shift Keying (QPSK), 16 Quadrature Amplitude Modulation (16QAM), 64QAM, 256QAM and so on. In the modulation process 160 in FIG. 1B, a corresponding demodulation manner will be employed in accordance with the modulation technique used in the modulation process 150.

Figure 2:
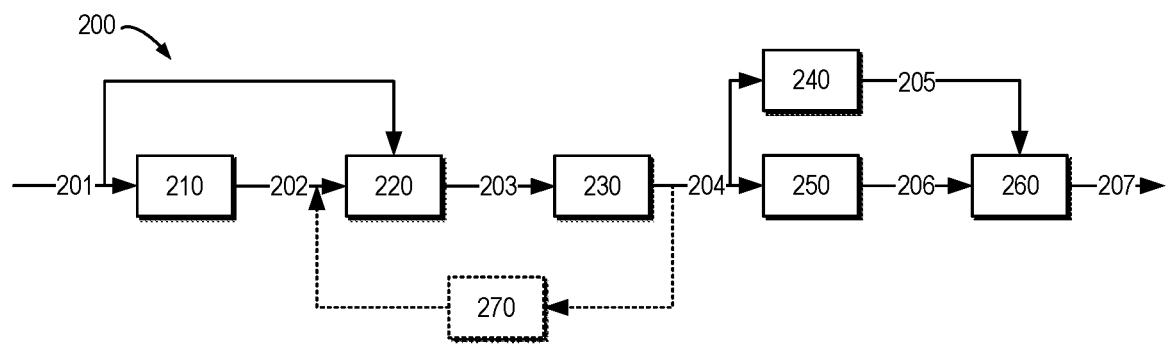
FIG. 2 shows a block diagram of a system for generating soft-decision information in accordance with some example embodiments of the present disclosure.

FIG. 2 shows a block diagram of a system 200 for generating soft-decision information in accordance with some example embodiments of the present disclosure. For example, the system 200 can be implemented at the receiving device 130 as shown in FIG. 1B. For example, the receiving device 130 may be the terminal device 111 or 112, or the network device 101 as shown in FIG. 1A.

As shown in FIG. 2, the system 200 may comprise a LRLD 210, a parallel interference cancellation (PIC) module 220, an error detection compensation (DEC) module 230, a Signal to Interference plus Noise Ratio (SINR) computation module 240, a normalization module 250, a LLR computation module 260 and a decision feedback module 270. It is to be understood that the structure of the system 200 is shown for the purpose of illustration, without suggesting any limitations to the scope of the present disclosure. In some example embodiments, the system 200 may include additional modules not shown and/or may omit some shown modules (such as, the decision feedback module 270), and the scope of the present disclosure is not limited in this regard.

In the following, embodiments of the present disclosure will be described with reference to a general communication system model with $N_t$ transmit antennas and $N_r$ receive antennas. This system model generically captures both single-user Multiple-Input Multiple-Output (SU-MIMO) as well as multi-user Multiple-Input Multiple-Output (MU-MIMO) communication scenarios. The received signal at the receiver can be given by:

$$y=Hx+n \quad (1)$$

where y is the $N_r \times 1$ received signal vector; H is the $N_r \times N_t$ channel matrix; x is the $N_t \times 1$ transmitted signal vector; and n is the $N_r \times 1$ complex circularly symmetric additive Gaussian noise process with $n \sim \mathcal{CN}(0, 1_{N_r})$.

Without loss of generality, it is assumed that $N_t \leq N_r$ and the rank of the channel matrix is $N_t$. Furthermore, the channel matrix H captures the effective channel with precoding at the transmitter, and therefore it is assumed that $N_t$ independent data streams are transmitted. In the cases where the noise process n is a coloured noise, it is assumed that appropriate pre-whitening done so that the above model still holds in general.

In some example embodiments, for example, when the receiving device 130 receives a signal 201 (that is, y) from the transmitting device 120, the received signal 201 may arrive at the LRLD 210. For example, the received signal 201 may correspond to a group of symbols (that is, x) transmitted from the transmitting device 120. In some example embodiments, the LRLD 210 may perform LR liner hard detection on the received signal 201 to derive a group of estimated symbols 202 for the group of symbols x.

Figure 3:
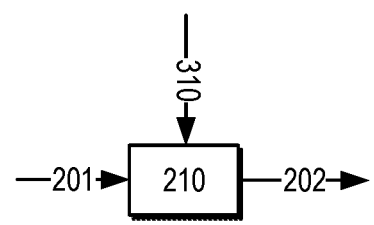
FIG. 3 shows a block diagram of a Lattice reduction linear detector in accordance with some example embodiments of the present disclosure.

FIG. 3 shows a block diagram of the LRLD 210 in accordance with some example embodiments of the present disclosure. As shown in FIG. 3, in some example embodiments, the LRLD 210 may perform, based on a channel matrix 310 (that is, H), the Lattice Reduction linear detection on the signal 201 to derive the group of estimated symbols 202.

As described above, the channel matrix H captures the effective channel with pre-coding at the transmitter, and therefore it is assumed that $N_t$ independent data streams are transmitted. That is, the channel can be regarded as comprising $N_t$ layers for transmitting the $N_t$ independent data streams. Let $\hat{x}_1$ be the estimate of the symbol transmitted on layer 1, obtained by employing a LR-linear hard detection operation on the received signal 201. Denote the symbol estimate vector as $\hat{x}=[\hat{x}_1, \hat{x}_2, \ldots, x_{N_t}]^T$, where $\hat{x}=$LR–LinearDetector(y,H). The function LR–LinearDetector(·) represents any LRLD operation currently known or to be developed in the future. The symbol detection error corresponding to layer 1 can be given by:

$$\epsilon_l = |x_l - \hat{x}_l|, l=1, \ldots, N_t \qquad (2)$$

With reference to FIG. 2, the received signal 201 and the output 202 of the LRLD 210 may be provided to the PIC module 220. The PIC module 220 may use the output 202 of the LRLD 210 to perform parallel interference cancellation from the received signal 201.

In some example embodiments, the PIC module 220 may perform inter-layer interference cancellation on the group of estimated symbols 202 to derive a further group of estimated symbols 203 for the group of symbols x. In some example embodiments, the PIC module 220 may estimate, for a given layer of the $N_t$ layers, an interference effect caused by other layers of the $N_t$ layers based on estimated symbols corresponding to the other layers from the group of estimated symbols 202, and then cancel the interference effect from the signal 201 (that is, y).

The PIC operation for layer k can be summarized as:

$$\hat{y}_k = y - \Sigma_{l \neq k} h_l \hat{x}_l, k=1, \ldots, N_t \qquad (3)$$

To simplify the implementation, the above equation (3) can be re-written as follows:

$$\hat{y}_k = h_k \hat{x}_k + (y - H\hat{x}), K=1, \ldots, N_t \qquad (4)$$

It is noted that, intuitively, the second term denoted by $\hat{n} = y - H\hat{x}$ can be interpreted as the "estimated additive noise" component. Thus, the above equation (3) can be re-written as follows:

$$\hat{y}_k = h_k \hat{x}_k + \hat{n}, k=1, \ldots, N_t \qquad (5)$$

Figure 4:
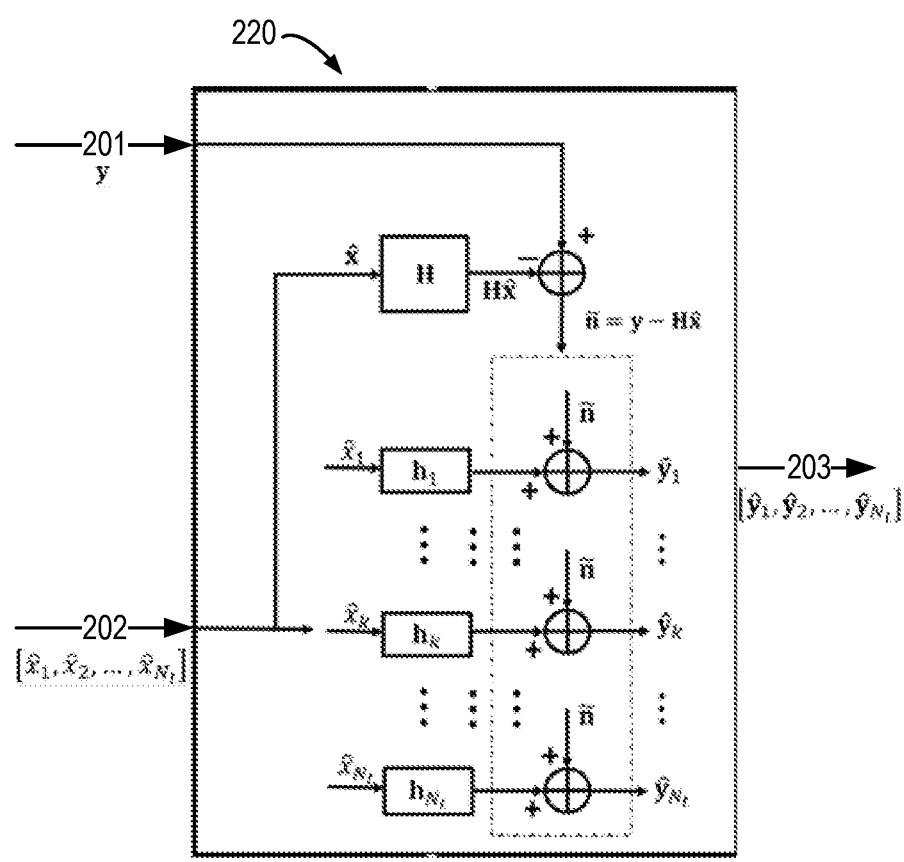
FIG. 4 shows a block diagram of a parallel interference cancellation module in accordance with some example embodiments of the present disclosure.

The implementation of the PIC operation according to the above equation (5) is illustrated in FIG. 4.

As shown in FIG. 2, the output 203 of the PIC module 220 may be provided to the DEC module 230. The DEC module 230 may minimize the interference effect of symbol detection errors in the output 203 of the PIC module 220.

In some example embodiments, the DEC module 230 may perform symbol detection error compensation on the group of estimated symbols 203 to derive a further group of estimated symbols 204 for the group of symbols x. In some example embodiments, the DEC module 230 may determine, for a given layer of the $N_t$ layers, a filter for filtering an estimated symbol of the group of estimated symbols 203 corresponding to the given layer, such that an interference effect due to symbol detection errors in other layers of the $N_t$ layers is minimized. The DEC module 230 may then apply the filter to the estimated symbol corresponding to the given layer.

It can be seen that, after cancelling the inter-layer interference, the output 203 of the PIC module 220 for a layer may still contain the residual interference due to the symbol detection errors in other layers. In other words, the PIC output $\hat{y}_k$ is still corrupted by the residual interference due to $\{\epsilon_l\}_{l \neq k}$. In this event, the above equation (3) can be rewritten as:

$$\hat{y}_k = y - \Sigma_{l \neq k} h_l \hat{x}_l = h_k x_k + \Sigma_{l \neq k} \epsilon_l h_l + n = h_k x_k + i_k + n \qquad (6)$$

where the second term, $i_k = \Sigma_{l \neq k} \epsilon_l h_l$, models the effects of the symbol detection errors incurred in the other layers.

The objective of the DEC module 230 is to minimize the effect of $i_k$ from $\hat{y}_k$. For this purpose, a linear filter with the minimum mean squared error (MMSE) criterion can be utilized. That is, the filter minimizes the mean squared error among the class of linear filters.

Therefore, the problem can be formulated as an optimization problem to find out a set of filters $\{w_1, \ldots, w_{N_t}\}$ such that:

$$w_k = \operatorname{argmin}_w \mathbb{E}[|x_k - w^H \hat{y}_k|^2] \qquad (7)$$

Let $P^{(k)} = \operatorname{diag}([P^{(k)}_{1,1}, P^{(k)}_{2,2}, \ldots, P^{(k)}_{N_t,N_t}])$ and $$P^{(k)}_{l,l} = \begin{cases} p_s, & l = k \\ \sigma^2_{e,l}, & l \neq k \end{cases} \qquad (8)$$

where $\rho_s = \mathbb{E}[|x_k|^2]$ is the average energy of the transmitted symbol, and $\sigma^2_{e,l} = \mathbb{E}[|\epsilon_l|^2]$ is the mean square detection error (MSE) for layer 1.

It is shown below that the optimal $w_k$ can be given by:

$$w_k^H = \rho_s h_k^H (H P^{(k)} H^H + I_{N_t})^{-1} \qquad (9)$$

The DEC output can be then given by:

$$\hat{y}_k = w_k^H \hat{y}_k; k=1, \ldots, N_t \qquad (10)$$

The DEC outputs are decoupled into $N_t$ uncorrelated streams.

For any given layer 1, the detection MSE can be given by:

$$\sigma^2_{e,l} = \mathbb{E}[|\epsilon_l|^2] = \Sigma_{x \in Q} \Sigma_{\hat{x} \in Q} |x - \hat{x}|^2 \rho_e(\hat{x}|x) \cdot \rho(x) \qquad (11)$$

where $\rho(x)$ is the probability of transmitting symbol x, and $\rho_e(\hat{x}|x) = \mathbb{P}(\hat{x} \neq x|x)$ is the error detection probability, the probability of falsely detecting the transmitted symbol x as $\hat{x}$.

Assuming that the transmitted symbols are equi-probable, the above equation (11) can be rewritten as:

$$\sigma^2_{e,l} = \frac{1}{|Q|} \sum_{k \in Q} \sum_{\hat{x} \neq x} |x - \hat{x}|^2 p_e(\hat{x}|x) \qquad (12)$$

Obtaining $\sigma^2_{e,l}$ is difficult since the detection error probability for LR-detector, $\rho_e(\hat{x}|x)$, is difficult to tract analytically. However, some simulation-based methods can be adopted to compute $\sigma^2_{e,l}$. For example, $\sigma^2_{e,l}$ can be evaluated through extensive simulation for various values of MCS levels and SINRs and can be stored in a lookup table. On the other hand, this approach may not be attractive for memory-constrained designs.

In view of the above considerations, in some example embodiments, one simple approximation for $\sigma^2_{e,l}$ can be employed, which makes use of the fact that the symbol error probability of any coherent combining receiver over a fading channel is a monotonically decreasing function of the received SINR. Let the error probability be $$\mathbb{P}_e(x) = \Sigma_{\hat{x} \neq x} \rho_e(\hat{x}|x) = 1 - \mathbb{P}(\hat{x}=x|x) \qquad (13)$$

Further, $$\mathbb{P}_e(x) \to 1, \text{ as sinr} \to 0 \quad (14)$$

and $$\mathbb{P}_e(x) \to 0, \text{ as sinr} \to \infty \quad (15)$$

where sinr denotes the SINR of the given layer. Therefore, the symbol detection error probability can be approximated as:

$$\mathbb{P}_e(\hat{x}|x) = \frac{1}{1+\text{sinr}} \quad (16)$$

Further, assuming that the detection error events are equiprobable, then $$p_e(\hat{x}|x) = \frac{1}{(|Q|-1)} \frac{1}{1+\text{sinr}} \quad (17)$$

Let the instantaneous SINR for layer l at the output of the LRLD be given by $\text{sinr}_l$. Using the above approximation $$\sigma_{e,l}^2 = \frac{1}{|Q|} \sum_{x \in Q} \sum_{\hat{x} \neq x} |\hat{x} - x|^2 p_e(\hat{x}|x) = \frac{E_{Ave}(Q)}{1+\text{snr}_1} \quad (18)$$

where $E_{Ave}(Q)$ is the "average inter-constellation distance" for the constellation, $Q$, defined as:

$$E_{Ave}(Q) := \frac{1}{|Q|} \frac{1}{(|Q|-1)} \sum_{x \in Q} \sum_{\hat{x} \neq x} |x - \hat{x}|^2 \quad (19)$$

As shown in FIG. 2, the output 204 of the DEC module 230 may be provided to both the SINR computation module 240 and the normalization module 250. The SINR computation module 240 may determine, based on the group of estimated symbols 204, respective SINRs for the $N_t$ layers. The normalization module 250 may normalize the output 204 of the DEC module 230 to ensure that the bias introduced by the equalizer is removed.

For any given layer k, the post-equalization SINR (PESINR) can be defined as:

$$SINR_{Eq,k} = \frac{P_{s,o}}{P_{IN,o}} \quad (20)$$

where $P_{s,o}$ is the signal power, and $P_{IN,o}$ is the interference-plus-noise power at the combiner output. The expression for PESINR can be given by:

$$SINR_{eq,k} = \frac{B_k}{1-B_k} \quad (21)$$

where $B_k = w_k^H h_k$. It can be verified that $B_k$ is real-valued and $0 \leq B_k \leq 1$.

In some example embodiments, the output 204 of the DEC module 230 may be normalized to ensure that the bias introduced by the equalizer is removed. Therefore, the de-biasing operation can be performed as below:

$$y_{norm,k} = \frac{\hat{y}_k}{B_k} = \frac{w_k^H \hat{y}_k}{B_k} \quad (22)$$

It is noted that the normalization of the output 204 of the DEC module 230 does not change the value of PESINR.

As shown in FIG. 2, the output 205 of the SINR computation module 240 and the output 206 of the normalization module 250 may be provided to the LLR computation module 260. In some example embodiments, the LLR computation module 260 may perform bit-wise LLR computation based on the SINRs 205 and the normalized group of estimated symbols 206. As used herein, a Likelihood Ratio (which refers to a probability ratio of one given bit is 1 against it is 0 or the other way around) is usually converted to log-domain and the resultant is generally termed as a LLR. In fact, LLR calculation plays a critical role in modern soft-information based decoding algorithms.

After normalization, the DEC output $\{y_{norm,1}, y_{norm,2}, \ldots, y_{norm,N_t}\}$ may represent a set of $N_t$ scalar channels, each with SINR corresponding to the SINR at the equalizer output. That is, $$y_{norm,k} = x_k + \hat{n}_k, k = 1, \ldots, N_t \quad (23)$$

where $$\hat{n}_k = \frac{1}{B_k} w_k^H (i_k + n).$$

Note that $$\sigma_{\hat{n},k}^2 = \text{Var}[\hat{n}_k] = \frac{P_{IN}}{B_k^2} = \frac{\rho_s}{SINR_{eq,k}}.$$

is assumed that the distribution of the noise term is approximated by the Gaussian distribution, i.e., $\hat{n}_k \sim \mathcal{CN}(0, \sigma_{n,k}^2)$. Thus, for bit $b_i$ in layer l, the LLR is computed as:

$$L_i^{(l)} = \log\left[\frac{\mathbb{P}(b_i^{(l)} = 1|y_{norm,l})}{\mathbb{P}(b_i^{(l)} = 0|y_{norm,l})}\right], i = 1, \ldots, \log_2|Q|, l = 1, \ldots, N_t \quad (24)$$

The LLR can be rewritten as:

$$L_i^{(l)} = \log\left[\frac{\mathbb{P}(b_i^{(l)} = 1|y_{norm,l})}{\mathbb{P}(b_i^{(l)} = 0|y_{norm,l})}\right] = \log\left[\frac{\sum_{s_l \in Q} \mathbb{P}(b_i^{(l)} = 1, s_l|y_{norm,l})}{\sum_{s_m \in Q} \mathbb{P}(b_i^{(l)} = 1, s_m|y_{norm,l})}\right] = \log\left[\frac{\sum_{s_l \in Q \cdot b_i^{(l)} = 1} \mathbb{P}(y_{norm,l}|s_l)}{\sum_{s_l \in Q \cdot b_i^{(l)} = 0} \mathbb{P}(y_{norm,m}|s_l)}\right] \quad (25)$$

where we have assumed uniform a priori probability for the symbols. Thus, $$L_i^{(l)} = \log\left[\frac{\sum_{s_l \in Q \cdot b_i^{(l)} = 1} \exp\left(-\frac{|y_{norm,l} - s_l|^2}{\sigma_{\hat{n},l}^2}\right)}{\sum_{s_l \in Q \cdot b_i^{(l)} = 0} \exp\left(-\frac{|y_{norm,l} - s_l|^2}{\sigma_{\hat{n},l}^2}\right)}\right] \quad (26)$$

The above equation yields the guideline for LLR computation. One straightforward way is to extensively evaluate the above expression for each bit which can be computationally very expensive. In some example embodiments, any optimized method currently known or to be developed in the future can be utilized to compute LLRs based on implementation and complexity considerations. The scope of the present disclosure is not limited in this regard.

As shown in FIG. 2, in some example embodiments, the system 200 may include the decision feedback module 270. In some example embodiments, the decision feedback module 270 may determine a first reliability of the output 202 of the LRLD 210 and a second reliability of the output 204 of the DEC module 230. If the output 204 of the DEC module 230 is more reliable than the output 202 of the LRLD 210, the decision feedback module 270 may feedback the DEC output 204 as an input to the PIC module 220 to perform another round of interference cancellation, thereby improving the SINR at the PIC output.

In some example embodiments, the detector performance may be characterized via the Euclidean distance between the detector output and the received signal. Thus, this distance metric can be used as a test condition to feedback the DEC output as an input to the PIC module 220 to perform another round of interference cancellation thereby improving the SINR at the output of the PIC module 220. In some example embodiments, motivated by the considerations discussed above, the decision feedback module 270 may perform the following steps:

(1) Symbol detection: the output 204 of the DEC module 230 is used to obtain perform another round of symbol detection to yield hard-decision symbol estimates.

$$\hat{x}_{fb} = \text{Detector}(\hat{y}_{norm}) \quad (27)$$

(2) Metric computation: for the LR detector output $\hat{x}$ and the DEC output $\hat{x}_{fb}$, compute the corresponding metrics $d(\hat{x}, y)$ and $d(\hat{x}_{fb}, y)$, where $d(x, y) = \|y - H_s x\|^2$ is the Euclidean distance of a constellation point x from the received signal y.

(3) Symbol decision feedback: the metrics computed above are used as a reliability test condition to perform decision feedback. In some example embodiments, if the output 204 of the DEC module 230 is more reliable than the output 202 of the LRLD 210, the output 204 of the DEC module 230 may be fed back to the PIC module 220 as an input. That is, if $d(\hat{x}_{fb}, y) < d(\hat{x}, y)$, the input of the PIC module 220 can be set as: $\hat{x}_{in} = \hat{x}_{fb}$; otherwise, the feedback procedure can be skipped. After the feedback, PIC, DEC steps can be performed to finally compute LLRs.

In some example embodiments, the implementation of the DEC module 230 can be further simplified. From the discussion on the DEC module 230, it can be seen that each layer of the channel is processed by a separate LMMSE filter as below:

$$w_k^H = \rho_s h_k^H (H P^{(k)} H^H + I_{N_r})^{-1}, k=1, \ldots, N_t \quad (28)$$

which requires a separate matrix inversion to compute $w_k^H$ thereby imposing a requirement of $N_t$ matrix inversions and therefore can be computationally very expensive. In some example embodiments, $N_t$ matrix inversions can be reduced into a single matrix inversion for computing all $N_t$ LMMSE filter coefficient vectors. This can be done by replacing the set of coefficient vectors $\{w_k^H\}$ with the set $\{u_k^H\}$ where $$u_k^H = h_k^H (H P H^H + I_{N_r})^{-1}, k=1, \ldots, N_t \quad (29)$$

where P is a $N_t \times N_t$ diagonal matrix such that:

$$P_{l,k} = \begin{cases} \sigma_{e,l}^2, & l = k \\ 0, & l \neq k \end{cases} \quad (30)$$

In some example embodiments, the DEC module 230 may use $\{u_k^H\}$ instead of $\{w_k^H\}$ if there is no change in the PESINR. Further, in the current context, it can be shown that $\{u_k^H\}$ can be expressed as $\{u_k^H\} = \{c_k w_k^H\}$, where $c_k$ is a constant dependent only on layer k. The expressions for $\{u_k^H\}$ can be further simplified as:

$$U = \begin{bmatrix} u_1^H \\ u_2^H \\ \vdots \\ u_{N_t}^H \end{bmatrix} = (H^H H P + I_{N_t})^{-1} H^H \quad (31)$$

which just requires inverting a matrix of dimension $N_t \times N_t$.

In some example embodiments, if the implementation of the DEC module 230 is simplified as described above, the calculation of PESINR performed by the PESINR computation module 240 can be straight forward. For the simplified DEC module 230, the output of the DEC module 230 can be given by:

$$\hat{y}_k = u_k^H \hat{y}_k = u_k^h (h_k x_k + i_k + n) \quad (32)$$

The signal power can be given by:

$$P_{s,k} = \rho_s |u_k^H h_k|^2 \quad (33)$$

The interference-plus-noise part can be given by:

$$v_{IN,k} = u_k^H (i_k + n) \quad (34)$$

The interference-plus-noise power can be given by:

$$P_{IN,k} = \mathbb{E}[|v_{IN,k}|^2] u_k^H (H P H^H - \sigma_{e,k}^2 h_k h_k^H + I_{N_r}) \\ u_k = u_k^H h_k (1 - \sigma_{e,k}^2 u_k^H h_k) \quad (35)$$

Thus, the post combined SINR can be given by:

$$SINR_{eq,k} = \frac{P_{s,k}}{P_{IN,k}} = \rho_s \frac{u_k^H h_k}{(1 - \sigma_{e,k}^2 u_k^H h_k)} \quad (36)$$

It is to be understood that the PESINR of the simplified DEC module is equal to the PESINR of the DEC module as discussed above. Further, the normalization factor can be given by:

$$B_k = u_k^H h_k \quad (37)$$

In view of the above, it can be seen that LRLDs have robust performance, and they can be leveraged only when hard-decisions are made at the symbol level using lattice reduction. Consequently, it is challenging to generate soft-valued outputs at the symbol level from the LRLDs without hurting the performance. Due to this soft-value generation issue, LRLDs find very limited deployment in the MU/MIMO receivers despite their robustness against channel conditions. Embodiments of the present disclosure propose a scheme to generate soft-decisions at the symbol level for LRLDs. LLRs generated based on soft symbol decisions have superior performance compared to the LLRs generated by hard symbol decisions.

Figure 5A:
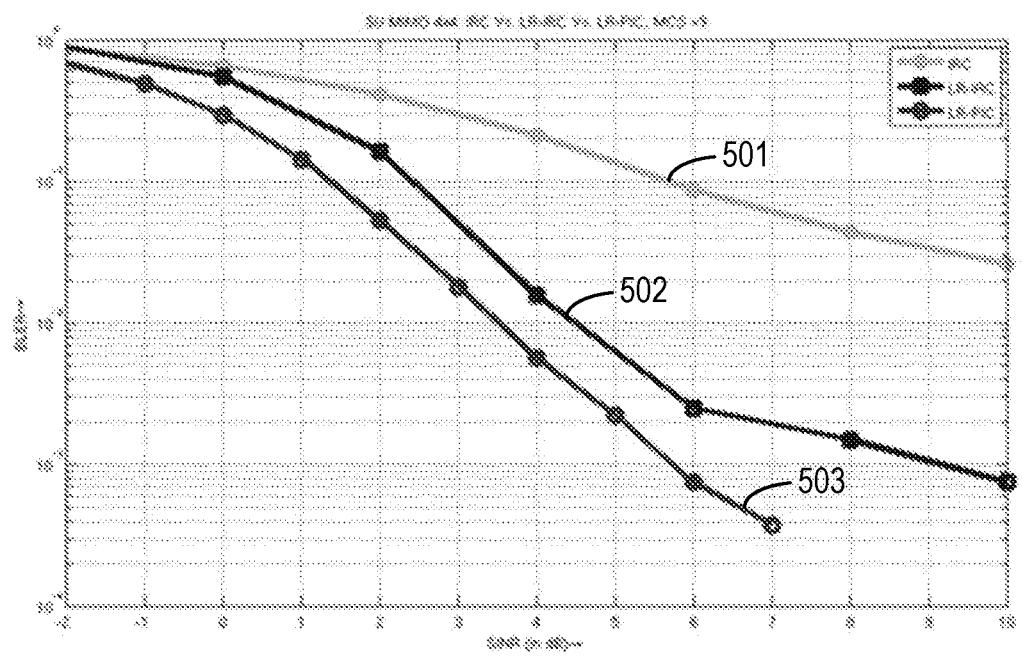
FIGS. 5A-5C are diagrams illustrating performance comparison among different schemes.
Figure 5B:
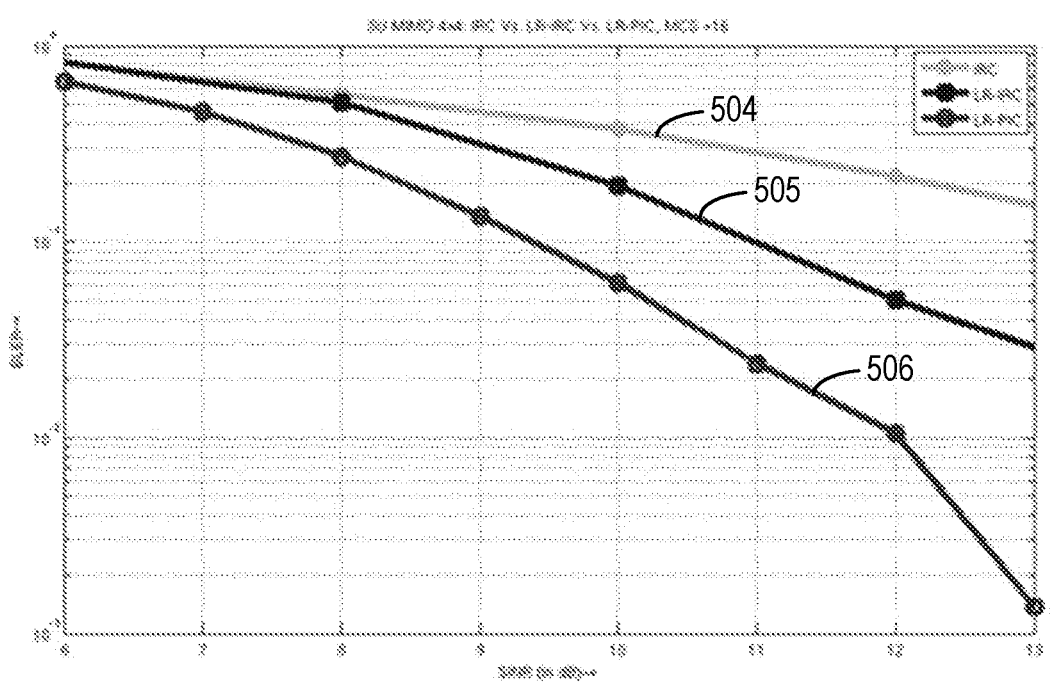
Figure 5C:
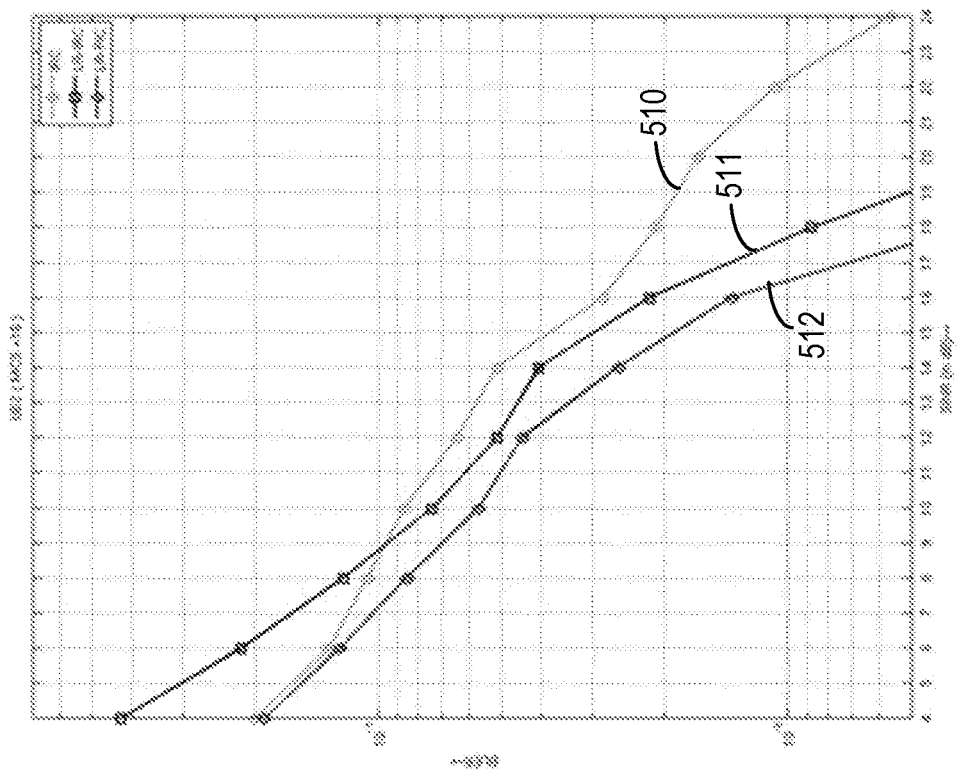
Figure 5C:
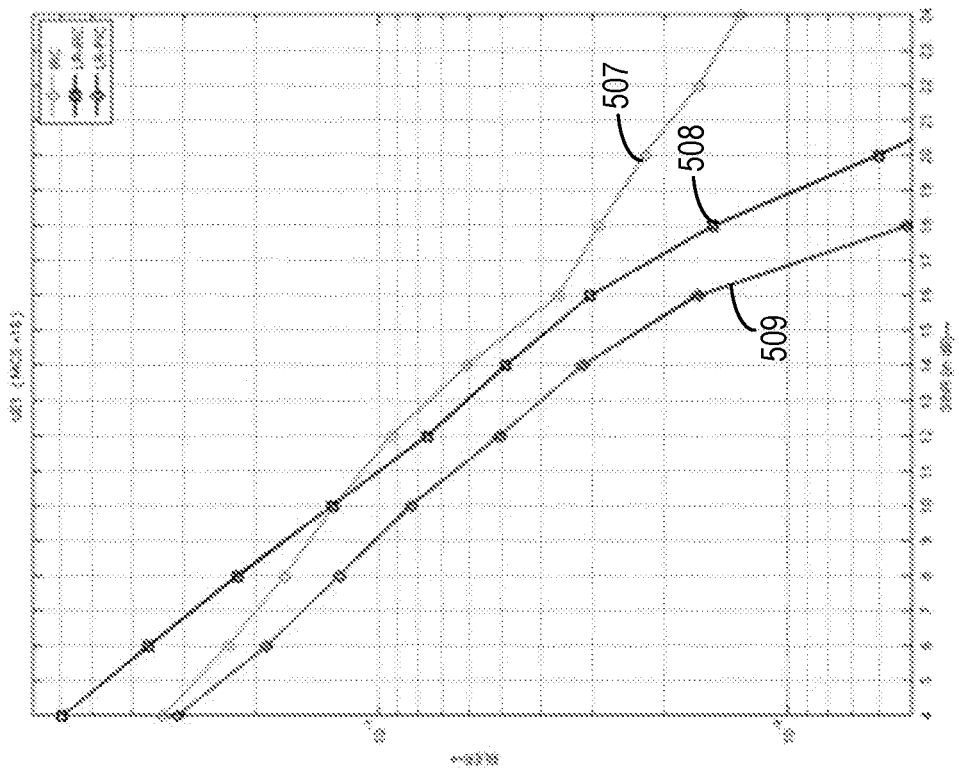

As an example rather than limitation, computer instructions for generating soft-decision information in accordance with embodiments of the present disclosure can be constructed as following:

Soft-decision Information Generation Algorithm
Input: y, H = [h$_1$, . . . , h$_{N_t}$], $Q_l$, l = 1, . . . , N$_t$ 1. Generate augmented channel and received signal: $H_{aug} = \begin{bmatrix} H \\ I_{N_t} \end{bmatrix}$;

$y_{aug} = \begin{bmatrix} y \\ 0_{N_t \times 1} \end{bmatrix}$;

2. Shift and scale the received signal: $\tilde{y} = \Lambda^{-1}(y_{aug} - H_{aug}\beta)$;
3. Perform lattice reduction on H$_{aug}$: [H̃, T] = Lattice reduction(H$_{aug}$);
H̃ = H$_{aug}$T;
4. Perform LR-MMSE combining: $z_{LR} = (\tilde{H}^H\tilde{H})^{-1}\tilde{H}^H\tilde{y}$;
5. Quantize LR domain signal to the nearest integer: $z_l$ = integer[$z_{LR,l}$],
l = 1, . . . , N$_t$;
6. Transform to the signal domain and hard-limit: $\hat{s}_l$ = [Tz$_l$];
7. Shift and scale the detected signal: $\hat{x} = \Lambda\hat{s} + \beta$;
8. Soft symbol output generation:
for l = 1: N$_t$ perform interference subtraction: $y_l = y - \sum_{i \neq l}^{N_t} h_i\hat{x}_i$;

perform DEC and normalization: $y_{norm,l} = \frac{u_l^H y}{u_l^H h_l}$;

perform SINR computation: $SINR_{eq,l} = \rho_s \frac{u_l^H h_l}{(1 - \sigma_{e,l}^2 u_l^H h_l)}$;

end
9. Perform LLR computation: $L_k^{(l)}$ = LLR(b$_k^{(l)}$,y$_{norm,l}$,SINR$_{eq,l}$), k = 1, . . . , log$_2$ M$_l$.
Output: Bit-wise LLR, {L$_k^{(l)}$, k = 1, . . . , log$_2$ M$_l$}, l = 1, . . . , N$_t$
End of soft-decision information generation algorithm FIGS. 5A-5C are diagrams illustrating performance comparison among different schemes. In FIGS. 5A-5C, for comparison and benchmarking, the performance of embodiments of the present disclosure is evaluated against the following SU/MU-MIMO detection schemes: Interference Rejection (IRC) receiver scheme and Lattice Reduction based IRC (LR-IRC) scheme. The IRC receiver is quite popular among MIMO receivers and is adopted commonly in the SU/MU-MIMO receiver architectures. The popularity of the IRC receiver stems due to its linearity, relative simplicity and robust performance owing to the strong interference rejection capability. In the LR-IRC detector, the IRC-based detection is done in lattice domain and the output of the detector is symbol-level hard decisions.

In FIGS. 5A-5C, the MU-MIMO communication in a 5G cellular network is considered where the network device and the terminal devices are equipped with multiple antennas. The evaluation focuses on the communication over UL channels where the network device receives the transmissions from the terminal devices. The scenario is massive MIMO scenario with transmitter and receiver beam forming. Table 1 lists the simulation parameters used for the evaluations:

TABLE 1

| Simulation Parameter | Value |
| --- | --- |
| Carrier Frequency | 3.5 GHz. |
| Bandwidth | 10 MHz |
| Scenario | Uplink: Single-user/Multi-user |
| BS Physical Antenna Configuration (M × N × P) | 8 × 8 × 2 |
| (d$_H$, d$_V$) | (0.52, 0.72) |
| BS Antenna ports | 2/4/8 |
| UE Physical Antenna Configuration (M × N × P) | (1 × 1 × 2)/(2 × 1 × 2) |
| UE Antenna ports | 2/4 |
| Beamforming type | Grid of Beams (GoB) |
| Channel Model | 3GPP CDL-A (NLOS Channel) |
| Modulation and Coding Scheme (MCS) Values | 3GPP MCS Table 1 |
| Channel Estimation (CE) type | Practical CE |
| Receiver/Equalizer | IRC/LR-IRC/LR-PIC |
| Simulation time | 5 s |

FIG. 5A shows performance comparison in one case, where SU-MIMO, N$_r$=4, N$_t$=4, MCS=9 and QPSK are adopted. FIG. 5A shows three BLER vs. SINR curves 501, 502 and 503, where the curve 501 corresponds to the IRC receiver scheme, the curve 502 corresponds to the LR-IRC scheme and the curve 503 corresponds to the scheme (also referred to as "LR-PIC scheme") in accordance with embodiments of the present disclosure. FIG. 5B shows performance comparison in another case, where SU-MIMO, N$_r$=4, N$_t$=4, MCS=16 and 16-QAM are adopted. FIG. 5B shows three BLER vs. SINR curves 504, 505 and 506, where the curve 504 corresponds to the IRC receiver scheme, the curve 505 corresponds to the LR-IRC scheme and the curve 506 corresponds to the LR-PIC scheme in accordance with embodiments of the present disclosure. FIG. 5C shows performance comparison in a further case, where MU-MIMO (2 UEs are supported, such as, UE 1 and UE 2), N$_r$=2, N$_t$=4, MCS=16 and 16-QAM are adopted. FIG. 5C shows three BLER vs. SINR curves 507, 508 and 509 for UE 1 and three BLER vs. SINR curves 510, 511 and 512 for UE 2, where the curves 507 and 510 correspond to the IRC receiver scheme, the curves 508 and 511 correspond to the LR-IRC scheme and the curves 509 and 512 correspond to the LR-PIC scheme in accordance with embodiments of the present disclosure.

It can be seen from FIGS. 5A-5C that the LR-PIC scheme outperforms the LR-IRC scheme and the IRC receiver scheme by 2-4 dB (at 10% BLER point). Though the LR-IRC scheme is robust in symbol detection, it exhibits degraded performance due to hard symbol output generation. On the other hand, the LR-PIC scheme capitalizes on robust detection capability of the LR-IRC scheme as well as generates soft symbol output, thereby exhibiting a superior performance.

Figure 6:
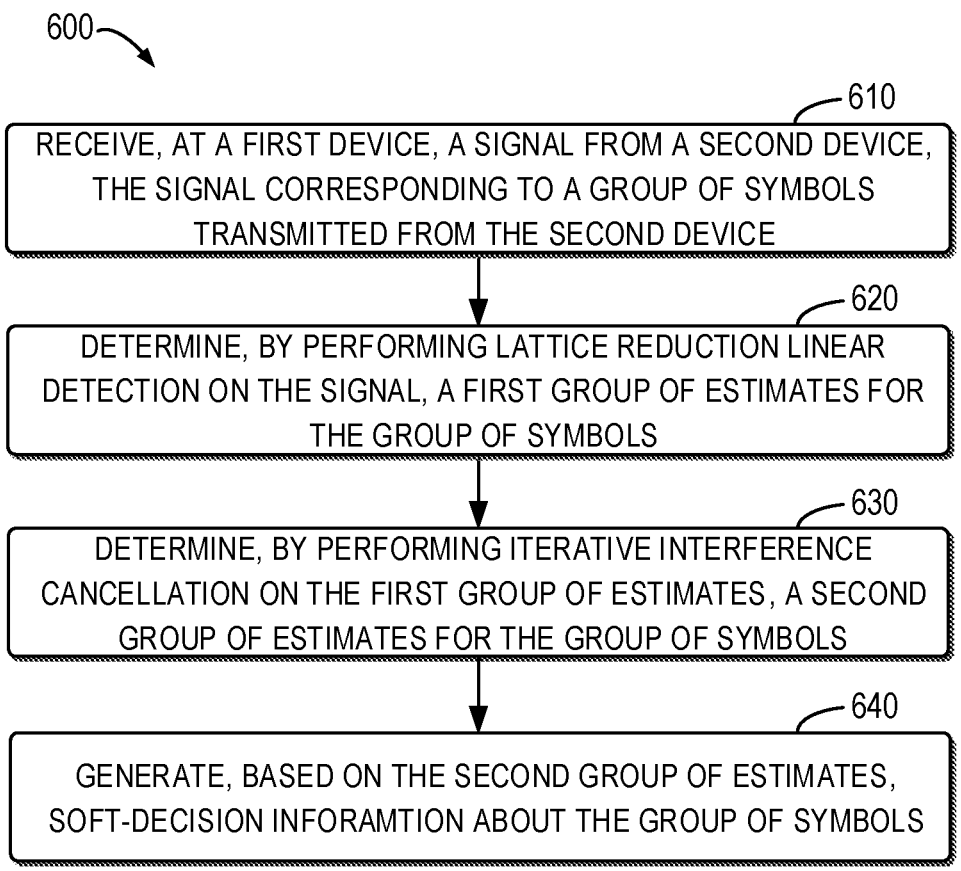
FIG. 6 shows a flowchart of a method for generating soft-decision information in accordance with some example embodiments of the present disclosure.

FIG. 6 shows a flowchart of a method 600 for generating soft-decision information in accordance with some example embodiments of the present disclosure. The method 600 can be performed by the receiving device 130 (referred to as "first device" in the following) in the communication network 100. For example, the receiving device 130 may be the terminal device 111 or 112, or the network device 101 as shown in FIG. 1. It is to be understood that the method 600 may include additional blocks not shown and/or may omit some shown blocks, and the scope of the present disclosure is not limited in this regard.

At block 610, the first device receives a signal from a second device (such as, the transmitting device 120). The signal may correspond to a group of symbols transmitted from the second device.

At block 620, the first device determines, by performing Lattice Reduction linear detection on the signal, a first group of estimated symbols for the group of symbols.

In some example embodiments, the first device performs, based on a matrix characterizing a channel used to transmit the group of symbols from the second device to the first device, the Lattice Reduction linear detection on the signal.

At block 630, the first device determines, by performing iterative interference cancellation on the first group of estimated symbols, a second group of estimated symbols for the group of symbols.

In some example embodiments, a channel used to transmit the group of symbols from the second device to the first device comprises a plurality of layers for transmitting the group of symbols respectively. The first device performs the iterative interference cancellation on the first group of estimated symbols by: performing inter-layer interference cancellation on the first group of estimated symbols to derive a third group of estimated symbols for the group of symbols; and performing symbol detection error compensation on the third group of estimated symbols to derive the second group of estimated symbols for the group of symbols.

In some example embodiments, the first device performs the inter-layer interference cancellation on the first group of estimated symbols by: estimating, for a given layer of the plurality of layers, an interference effect caused by other layers of the plurality of layers based on estimated symbols corresponding to the other layers from the first group of estimated symbols; and determining, by cancelling the interference effect from the signal, one of the third group of estimated symbols corresponding to the given layer.

In some example embodiments, the first device performs the symbol detection error compensation on the first group of estimated symbols by: determining, for a given layer of the plurality of layers, a filter for filtering an estimated symbol of the third group of estimated symbols corresponding to the given layer, such that an interference effect due to symbol detection errors in other layers of the plurality of layers is minimized; and determining, based on the estimated symbol and the filter, one of the second group of estimated symbols corresponding to the given layer.

In some example embodiments, the first device performs the iterative interference cancellation on the first group of estimated symbols by: performing the inter-layer interference cancellation on the second group of estimated symbols to update the third group of estimated symbols; and performing the detection error compensation on the updated third group of estimated symbols to update the second group of estimated symbols.

In some example embodiments, the first device performs the inter-layer interference cancellation on the third group of estimated symbols by: determining a first reliability of the first group of estimated symbols and a second reliability of the second group of estimated symbols; and in response to the second reliability exceeding the first reliability, performing the inter-layer interference cancellation on the second group of estimated symbols to update the third group of estimated symbols.

At block 640, the first device generates, based on the second group of estimated symbols, soft-decision information about the group of symbols for use by a decoder at the first device.

In some example embodiments, the first device generates the soft-decision information by: determining, based on the second group of estimated symbols, respective Signal to Interference plus Noise Ratios (SINRs) for the plurality of layers; normalizing the second group of estimated symbols; and generating the soft-decision information by performing bit-wise Log-Likelihood Ratio computation based on the SINRs and the normalized second group of estimated symbols.

In some example embodiments, an apparatus capable of performing the method 600 may comprise means for performing the respective steps of the method 600. The means may be implemented in any suitable form. For example, the means may be implemented in a circuitry or software module.

In some example embodiments, the apparatus capable of performing the method 600 (for example, the receiving device 130) comprises means for receiving a signal from a further apparatus, the signal corresponding to a group of symbols transmitted from the further apparatus; means for determining, by performing Lattice Reduction linear detection on the signal, a first group of estimated symbols for the group of symbols; means for determining, by performing iterative interference cancellation on the first group of estimated symbols, a second group of estimated symbols for the group of symbols; and means for generating, based on the second group of estimated symbols, soft-decision information about the group of symbols for use by a decoder at the apparatus.

In some example embodiments, the means for performing the Lattice Reduction linear detection on the signal comprises: means for performing, based on a matrix characterizing a channel used to transmit the group of symbols from the further apparatus to the apparatus, the Lattice Reduction linear detection on the signal.

In some example embodiments, a channel used to transmit the group of symbols from the second device to the first device comprises a plurality of layers for transmitting the group of symbols respectively. The means for performing the iterative interference cancellation on the first group of estimated symbols comprises: means for performing inter-layer interference cancellation on the first group of estimated symbols to derive a third group of estimated symbols for the group of symbols; and means for performing symbol detection error compensation on the third group of estimated symbols to derive the second group of estimated symbols for the group of symbols.

In some example embodiments, the means for performing the inter-layer interference cancellation on the first group of estimated symbols comprises: means for estimating, for a given layer of the plurality of layers, an interference effect caused by other layers of the plurality of layers based on estimated symbols corresponding to the other layers from the first group of estimated symbols; and means for determining, by cancelling the interference effect from the signal, one of the third group of estimated symbols corresponding to the given layer.

In some example embodiments, the means for performing the symbol detection error compensation on the first group of estimated symbols comprises: means for determining, for a given layer of the plurality of layers, a filter for filtering an estimated symbol of the third group of estimated symbols corresponding to the given layer, such that an interference effect due to symbol detection errors in other layers of the plurality of layers is minimized; and means for determining, based on the estimated symbol and the filter, one of the second group of estimated symbols corresponding to the given layer.

In some example embodiments, the means for performing the iterative interference cancellation on the first group of estimated symbols comprises: means for performing the inter-layer interference cancellation on the second group of estimated symbols to update the third group of estimated symbols; and means for performing the detection error compensation on the updated third group of estimated symbols to update the second group of estimated symbols.

In some example embodiments, the means for performing the inter-layer interference cancellation on the third group of estimated symbols comprises: means for determining a first reliability of the first group of estimated symbols and a second reliability of the second group of estimated symbols; and means for in response to the second reliability exceeding the first reliability, performing the inter-layer interference cancellation on the second group of estimated symbols to update the third group of estimated symbols.

In some example embodiments, the means for generating the soft-decision information comprises: means for determining, based on the second group of estimated symbols, respective Signal to Interference plus Noise Ratios (SINRs) for the plurality of layers; means for normalizing the second group of estimated symbols; and means for generating the soft-decision information by performing bit-wise Log-Likelihood Ratio computation based on the SINRs and the normalized second group of estimated symbols.

Figure 7:
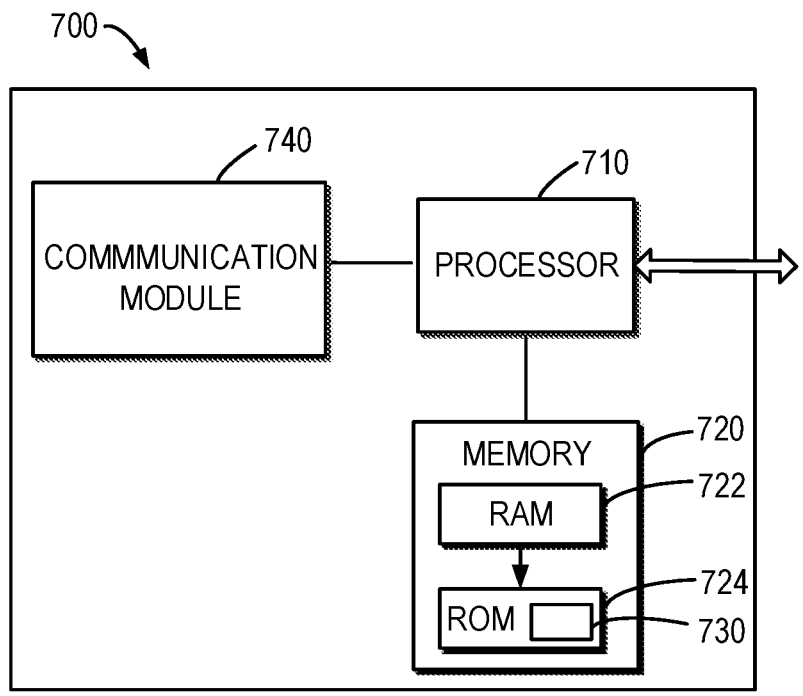
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be used to implement the transmitting device 120 or the receiving device 130 as shown in FIG. 1B. For example, the device 700 may be used to implement the network device 101 or the terminal device as shown in FIG. 1A, such as the terminal device 111 or 112 as shown in FIG. 1A. As shown in FIG. 7, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIG. 6. The embodiments of the present disclosure may also be implemented by hardware or by a combination of software and hardware.

Figure 8:
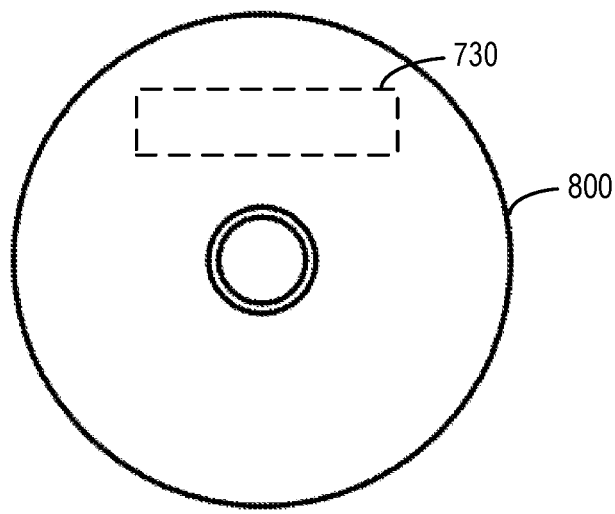
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 700 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 700 may be instead comprised in the distributed unit, and at least some of the described processes may be performed by the distributed unit.

In an embodiment, the execution of at least some of the functionalities of the apparatus 700 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 700 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 as described above with reference to FIG. 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one non-transitory memory including computer program code;
   the at least one non-transitory memory and the computer program code are configured to, with the at least one processor, cause the apparatus to:
      receive a signal from a further apparatus, the signal corresponding to a group of symbols transmitted from the further apparatus;
      determine, with performing lattice reduction linear detection on the signal, a first group of estimated symbols for the group of symbols;
      perform, based on a matrix characterizing a channel used to transmit the group of symbols from the further apparatus to the apparatus, the lattice reduction linear detection on the signal;
      determine, with performing iterative interference cancellation on the first group of estimated symbols, a second group of estimated symbols for the group of symbols; and
      generate, based on the second group of estimated symbols, soft-decision information about the group of symbols for use with a decoder at the apparatus.

2. The apparatus of claim 1, wherein the channel used to transmit the group of symbols from the further apparatus to the apparatus comprises a plurality of layers for transmitting the group of symbols respectively, and wherein the at least one non-transitory memory and the computer program code are configured to, with the at least one processor, cause the apparatus to:
   perform inter-layer interference cancellation on the first group of estimated symbols to derive a third group of estimated symbols for the group of symbols; and
   perform symbol detection error compensation on the third group of estimated symbols to derive the second group of estimated symbols for the group of symbols.

3. The apparatus of claim 2, wherein the at least one non-transitory memory and the computer program code are configured to, with the at least one processor, cause the apparatus to:
  estimate, for a given layer of the plurality of layers, an interference effect caused by other layers of the plurality of layers based on estimated symbols corresponding to the other layers from the first group of estimated symbols; and
  determine, with cancelling the interference effect from the signal, one of the third group of estimated symbols corresponding to the given layer.

4. The apparatus of claim 2, wherein the at least one non-transitory memory and the computer program code are configured to, with the at least one processor, cause the apparatus to:
  determine, for a given layer of the plurality of layers, a filter for filtering an estimated symbol of the third group of estimated symbols corresponding to the given layer, such that an interference effect due to symbol detection errors in other layers of the plurality of layers is minimized; and
  determine, based on the estimated symbol and the filter, one of the second group of estimated symbols corresponding to the given layer.

5. The apparatus of claim 2, wherein the at least one non-transitory memory and the computer program code are configured to, with the at least one processor, cause the apparatus to:
  perform the inter-layer interference cancellation on the second group of estimated symbols to update the third group of estimated symbols; and
  perform the detection error compensation on the updated third group of estimated symbols to update the second group of estimated symbols.

6. The apparatus of claim 5, wherein the at least one non-transitory memory and the computer program code are configured to, with the at least one processor, cause the apparatus to:
  determine a first reliability of the first group of estimated symbols and a second reliability of the second group of estimated symbols; and
  in response to the second reliability exceeding the first reliability, perform the inter-layer interference cancellation on the second group of estimated symbols to update the third group of estimated symbols.

7. The apparatus of claim 1, wherein the at least one non-transitory memory and the computer program code are configured to, with the at least one processor, cause the apparatus to:
  determine, based on the second group of estimated symbols, respective signal to interference plus noise ratios for the plurality of layers;
  normalize the second group of estimated symbols; and
  generate the soft-decision information with performing bit-wise log-likelihood ratio computation based on the signal to interference plus noise ratios and the normalized second group of estimated symbols.

8. A method comprising:
  receiving, at a first device, a signal from a second device, the signal corresponding to a group of symbols transmitted from the second device;
  determining, with performing lattice reduction linear detection on the signal, a first group of estimated symbols for the group of symbols;
  performing, based on a matrix characterizing a channel used to transmit the group of symbols from the second device to the first device, the lattice reduction linear detection on the signal;
  determining, with performing iterative interference cancellation on the first group of estimated symbols, a second group of estimated symbols for the group of symbols; and
  generating, based on the second group of estimated symbols, soft-decision information about the group of symbols for use with a decoder at the first device.

9. The method of claim 8, wherein the channel used to transmit the group of symbols from the second device to the first device comprises a plurality of layers for transmitting the group of symbols respectively, and performing the iterative interference cancellation on the first group of estimated symbols comprises:
  performing inter-layer interference cancellation on the first group of estimated symbols to derive a third group of estimated symbols for the group of symbols; and
  performing symbol detection error compensation on the third group of estimated symbols to derive the second group of estimated symbols for the group of symbols.

10. The method of claim 9, wherein performing the inter-layer interference cancellation on the first group of estimated symbols comprises:
  estimating, for a given layer of the plurality of layers, an interference effect caused by other layers of the plurality of layers based on estimated symbols corresponding to the other layers from the first group of estimated symbols; and
  determining, with cancelling the interference effect from the signal, one of the third group of estimated symbols corresponding to the given layer.

11. The method of claim 9, wherein performing the symbol detection error compensation on the first group of estimated symbols comprises:
  determining, for a given layer of the plurality of layers, a filter for filtering an estimated symbol of the third group of estimated symbols corresponding to the given layer, such that an interference effect due to symbol detection errors in other layers of the plurality of layers is minimized; and
  determining, based on the estimated symbol and the filter, one of the second group of estimated symbols corresponding to the given layer.

12. The method of claim 9, wherein performing the iterative interference cancellation on the first group of estimated symbols comprises:
  performing the inter-layer interference cancellation on the second group of estimated symbols to update the third group of estimated symbols; and
  performing the detection error compensation on the updated third group of estimated symbols to update the second group of estimated symbols.

13. The method of claim 12, wherein performing the inter-layer interference cancellation on the third group of estimated symbols comprises:
  determining a first reliability of the first group of estimated symbols and a second reliability of the second group of estimated symbols; and
  in response to the second reliability exceeding the first reliability, performing the inter-layer interference cancellation on the second group of estimated symbols to update the third group of estimated symbols.

14. The method of claim 8, wherein generating the soft-decision information comprises:

determining, based on the second group of estimated symbols, respective signal to interference plus noise ratios for the plurality of layers;

normalizing the second group of estimated symbols; and generating the soft-decision information with performing bit-wise log-likelihood ratio computation based on the signal to interference plus noise ratios and the normalized second group of estimated symbols.

15. A non-transitory computer readable storage medium comprising program instructions stored thereon, the instructions, when executed by an apparatus, causing the apparatus to:

receive a signal from a further apparatus, the signal corresponding to a group of symbols transmitted from the further apparatus;

determine, with performing lattice reduction linear detection on the signal, a first group of estimated symbols for the group of symbols;

perform, based on a matrix characterizing a channel used to transmit the group of symbols from the further apparatus to the apparatus, the lattice reduction linear detection on the signal;

determine, with performing iterative interference cancellation on the first group of estimated symbols, a second group of estimated symbols for the group of symbols; and generate, based on the second group of estimated symbols, soft-decision information about the group of symbols for use with a decoder at the apparatus.

* * * * *